US012800862B2

(12) United States Patent
Ray

(10) Patent No.: US 12,800,862 B2
(45) Date of Patent: Nov. 17, 2026

(54) STACKABLE FIBER OPTIC SPLICE HOLDER WITH SPACE EFFICIENT SPLICE HOLDER RETENTION

(71) Applicant: Amphenol Network Solutions, Inc., Liberty Lake, WA (US)

(72) Inventor: Craig Dwayne Ray, Raleigh, NC (US)

(73) Assignee: Amphenol Network Solutions, Inc., Liberty Lake, WA (US)

(*) Notice: Subject to any disclaimer, the term of this patent is extended or adjusted under 35 U.S.C. 154(b) by 277 days.

(21) Appl. No.: 18/696,074

(22) PCT Filed: Sep. 27, 2021

(86) PCT No.: PCT/US2021/052191

§ 371 (c)(1),
(2) Date: Mar. 27, 2024

(87) PCT Pub. No.: WO2023/048730

PCT Pub. Date: Mar. 30, 2023

(65) Prior Publication Data

US 2025/0012996 A1 Jan. 9, 2025

(51) Int. Cl.
*G02B 6/44* (2006.01)

(52) U.S. Cl.
CPC .................................. *G02B 6/4454* (2013.01)

(58) Field of Classification Search
CPC .................................................... G02B 6/4454
See application file for complete search history.

(56) References Cited

U.S. PATENT DOCUMENTS

| | | | | |
|---|---|---|---|---|
| 6,701,056 | B2 | 3/2004 | Burek | |
| 7,421,182 | B2 | 9/2008 | Bayazit | |
| 2008/0181569 | A1* | 7/2008 | Bayazit | G02B 6/44524 385/137 |
| 2021/0018710 | A1* | 1/2021 | Allen | G02B 6/4453 |

FOREIGN PATENT DOCUMENTS

WO 1997029395 A1 8/1997

OTHER PUBLICATIONS

PCT Search Report for corresponding PCT Application No. PCT/US2021/052191 dated Aug. 8, 2022, 3 pages.

* cited by examiner

*Primary Examiner* — Chad H Smith
(74) *Attorney, Agent, or Firm* — Lee & Hayes, P.C.

(57) ABSTRACT

A fiber optic splice holder (100) includes first and second sidewalls (102), a floor section (104) extending between the first and second sidewalls (102), a plurality of fiber optic splice sleeve retention post (114) that extend up from the floor section (104), and first and second siderails (116) that extend up from the floor section (104), wherein the plurality of fiber optic splice sleeve retention post (114) is arranged between the first and second siderails (116), wherein upper ends of the first and second siderails (116) are disposed below upper ends the fiber optic splice sleeve retention post (114), wherein the fiber optic splice sleeve retention post (114) each comprise splice sleeve side contact surfaces (118) that face one of the first and second sidewalls (102), and wherein the first and second siderails (116) each comprise splice sleeve end contact surfaces (124) that face the plurality of fiber optic splice sleeve retention post (114) and run substantially perpendicular to the splice sleeve side contact surfaces (118).

20 Claims, 4 Drawing Sheets

STACKABLE FIBER OPTIC SPLICE HOLDER WITH SPACE EFFICIENT SPLICE HOLDER RETENTION

This Application claims priority to International Application No. PCT/US2021/052191, filed Sep. 27, 2021, which is incorporated herein by reference.

TECHNICAL FIELD

The present invention generally relates to telecommunication hardware, and particularly relates to devices for mounting and storing splices of fiber optic cable.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages, such as increased bandwidth over distance with lower losses and maintenance, in comparison to traditional electrical transmission techniques.

Fiber optic networks include fiber optic connection boxes to store and secure splices of optical fiber and associated lengths of fiber optic cable. These fiber optic connection boxes are often provided at a network termination point. For example, a fiber optic connection box may be provided at a network termination point between service-provider network cabling and customer-side fiber optic cabling.

Modern network bandwidth and connectivity demands for fiber optic networks result in increasing number of fiber optic cables and/or increasing number of optical fibers per cable at a given termination point. As a result, installers may find it difficult or impossible to effectuate all necessary splices and store each splice securely within a standard sized fiber optic connection box. Accordingly, cost effective and user friendly solutions are needed to secure and store a high number of fiber optic splices in a small volume.

SUMMARY

A fiber optic splice holder is disclosed. According to an embodiment, the fiber optic splice holder comprises first and second sidewalls that are laterally spaced apart from one another, a floor section extending between the first and second sidewalls, a plurality of fiber optic splice sleeve retention posts that extend up from a planar upper surface of the floor section, and first and second siderails that extend up from the planar upper surface of the floor section and are laterally spaced apart from one another, wherein the plurality of fiber optic splice sleeve retention posts is arranged between the first and second siderails, wherein upper ends of the first and second siderails are disposed below upper ends of each of the fiber optic splice sleeve retention posts, wherein the fiber optic splice sleeve retention posts each comprise splice sleeve side contact surfaces that face one of the first and second sidewalls, and wherein the first and second siderails each comprise splice sleeve end contact surfaces that face the plurality of fiber optic splice sleeve retention posts and run substantially perpendicular to the splice sleeve side contact surfaces.

Separately or in combination, the plurality of fiber optic splice sleeve retention posts is arranged to comprise columns of the fiber optic splice sleeve retention posts that extend in a longitudinal direction between the first and second sidewalls, and wherein the splice sleeve side contact surfaces of the fiber optic splice sleeve retention posts from each of the columns define fiber optic splice sleeve channels that extend in a lateral direction between the first and second siderails.

Separately or in combination, the fiber optic splice sleeve channels are defined by contacting pairs of the fiber optic splice sleeve retention posts that are arranged on either side of the fiber optic splice sleeve channels, and wherein the splice sleeve side contact surfaces of each contacting pair converge inward so as to reduce a diameter of the respective fiber optic splice sleeve channel in an upper region of the fiber optic splice sleeve channel that is spaced apart from the floor section.

Separately or in combination, the splice sleeve side contact surfaces of each of the contacting pairs comprise upper spans and lower spans, the upper spans being further away from the floor section than the lower spans, and wherein the upper spans of each of the contacting pairs converge inward to a higher degree than the lower spans.

Separately or in combination, the plurality of fiber optic splice sleeve retention posts is arranged to comprise rows of the fiber optic splice sleeve retention posts that extend in the lateral direction between the first and second siderails, and wherein the fiber optic splice sleeve channels are defined by the splice sleeve side contact surfaces of the fiber optic splice sleeve retention posts from two of the rows arranged on either side of the fiber optic splice sleeve channels that are closest to one another.

Separately or in combination, the rows of the fiber optic splice sleeve retention posts are staggered such that the contacting pairs of the fiber optic splice sleeve retention posts are provided by fiber optic splice sleeve retention posts from different columns.

Separately or in combination, the plurality of fiber optic splice sleeve retention posts is arranged to comprise first, second, third and fourth ones of the columns of the fiber optic splice sleeve retention posts, and wherein the rows of the fiber optic splice sleeve retention posts are staggered such that fiber optic splice sleeve retention posts from the first and fourth columns are in the same row and such that such that fiber optic splice sleeve retention posts from the second and third columns are in the same row.

Separately or in combination, the splice sleeve side contact surfaces of a first fiber optic splice sleeve retention post converges towards a first one of the fiber optic splice sleeve channels and the splice side contact surfaces of a second fiber optic splice sleeve retention post converges towards a second one of the fiber optic splice sleeve channels, and wherein the first and second first fiber optic splice sleeve retention post are each disposed between the first and second fiber optic splice sleeve channels.

Separately or in combination, the first and second siderails are each elongated spans that extend parallel to the columns and comprise splice sleeve end contact surfaces that face one another.

Separately or in combination, the splice sleeve end contact surfaces extend between the planar upper surface of the floor section and the respective upper ends of the first and second siderails, and the splice sleeve side contact surfaces of the first and second siderails are substantially perpendicular to the planar upper surface of the floor section.

Separately or in combination, a vertical displacement of the first and second siderails as between the planar upper surface of the floor section and the respective upper ends of the first and second siderails is no greater than 25 percent of a vertical displacement of the fiber optic splice sleeve retention posts as between the planar upper surface of the floor section and the upper ends of the fiber optic splice sleeve retention posts.

Separately or in combination, the fiber optic splice holder further comprises first and second stacking retention features that are disposed on the first and second sidewalls, respectively, wherein the first and second stacking retention features form a pair of opposing surfaces that are above upper edge sides of the first and second sidewalls.

An assembly is disclosed. According to an embodiment, the assembly comprises first and second fiber optic splice holders stacked on top of one another, each of the first and second fiber optic splice holders comprising a floor section extending between the first and second sidewalls, a plurality of fiber optic splice sleeve retention posts that extend up from a planar upper surface of the floor section, and first and second siderails that extend up from the planar upper surface of the floor section and are laterally spaced apart from one another, stackability features formed in the first and second sidewalls, wherein the plurality of fiber optic splice sleeve retention posts is arranged between the first and second siderails, wherein the fiber optic splice sleeve retention posts each comprise splice sleeve side contact surfaces that face one of the first and second sidewalls, and wherein the first and second siderails each comprise splice sleeve end contact surfaces that face the plurality of fiber optic splice sleeve retention posts and run substantially perpendicular to the splice sleeve side contact surfaces, wherein the stackability features of the first fiber optic splice holder interface with the first and second sidewalls of the second fiber optic splice holder such that the second fiber optic splice holder is securely retained against the first fiber optic splice holder, and wherein the first and second siderails from the first fiber optic slice holder are spaced apart from the floor section of the second fiber optic slice holder.

Separately or in combination, for each of the first and second fiber optic splice holders the plurality of fiber optic splice sleeve retention posts is arranged to comprise columns of the fiber optic splice sleeve retention posts that extend in a longitudinal direction between the first and second sidewalls, the splice sleeve side contact surfaces of the fiber optic splice sleeve retention posts from each of the columns define fiber optic splice sleeve channels that extend in a lateral direction between the first and second siderails, and the fiber optic splice sleeve channels are accessible via gaps between the first and second siderails from the first fiber optic slice holder and the floor section of the second fiber optic slice holder.

Separately or in combination, the assembly further comprises a first fiber optic splice sleeve that is disposed within and securely retained by a first one of the fiber optic splice sleeve channels from the first fiber optic slice holder, wherein side surfaces of the first fiber optic splice sleeve are retained by the splice sleeve side contact surfaces from a first contacting pair of the fiber optic splice sleeve retention posts, and wherein opposite facing ends of the first fiber optic splice sleeve are retained by the splice sleeve end contact surfaces of the first and second siderails from the from the first fiber optic slice holder.

Separately or in combination, the first fiber optic splice sleeve forms a splice between two ribbon fibers, and wherein the two ribbon fibers extend over the first and second siderails from the from the first fiber optic slice holder and below the floor section from the second fiber optic splice holder.

Separately or in combination, the splice sleeve side contact surfaces of the first contacting pair converge inward so as to retain an upper side of the first fiber optic splice holder.

Separately or in combination, the assembly further comprises a second fiber optic splice sleeve that is disposed within and securely retained by a second one of the fiber optic splice sleeve channels from the first fiber optic slice holder, wherein side surfaces of the second fiber optic splice sleeve are retained by the splice sleeve side contact surfaces from a second contacting pair of the fiber optic splice sleeve retention posts, and wherein opposite facing ends of the second fiber optic splice sleeve are retained by the splice sleeve end contact surfaces of the first and second siderails from the from the first fiber optic slice holder.

Separately or in combination, the first and second fiber optic splice sleeves are immediately adjacent to one another, and wherein the first contacting pair is staggered with respect to the second contacting pair such that the first contacting pair does not contact the second fiber optic splice sleeve and such that the second contacting pair does not contact the first fiber optic splice holder.

Separately or in combination, a first one of the fiber optic splice sleeve retention posts from the second contacting pair comprises a planar back surface that faces and is spaced apart from the first fiber optic slice holder.

DETAILED DESCRIPTION

Embodiments of a fiber optic splice holder are described herein. The fiber optic splice holder is a modular tray that is configured to accommodate multiple splices of fiber optic cable, and in particular splices that are effectuated by cylindrical fiber optic splice sleeves. To this end, the fiber optic splice holder comprises a plurality fiber optic splice sleeve retention posts that extend up from a floor section of the fiber optic splice holder and a pair of siderails that extend up from the floor section and are disposed on either side of the plurality fiber optic splice sleeve retention posts. The fiber optic splice sleeve retention posts are arranged to provide channels that insertably receive the fiber optic splice sleeves. The siderails form lateral boundaries that prevent the fiber optic splice sleeves from sliding laterally across the fiber optic splice holder.

The fiber optic splice holder has numerous advantages, including the following. The fiber optic splice sleeve retention posts can be semi-rigid and contoured for low entry radius. This results in low stress being placed on the fiber optic splice sleeves. The fiber optic splice sleeve retention posts may be configured with contacting surfaces that converge inward moving towards upper ends of the fiber optic splice sleeve retention posts. This converging design prevents the fiber optic splice sleeves from moving away from the floor section while maintaining loose contact. The fiber optic splice sleeve retention posts may be arranged in staggered rows so that only some of the fiber optic splice sleeve retention posts extending across a width of the fiber optic splice holder come into contact with a fiber optic splice sleeve. This staggered configuration maximizes area density of the optic splice sleeves by allowing for close spacing between the fiber optic splice sleeves, while simultaneously allowing the splice sleeve retention posts to have an advantageous balance between rigidity and flexibility. The siderails provide an effective mechanism for maintaining the position of the fiber optic splice sleeves and eliminate the need for the fiber optic splice sleeve retention posts to tightly retain the fiber optic splice sleeves. Moreover, the siderails add strength to the fiber optic splice holder and minimize the tendency of the fiber optic splice holder to bow, which allows the length of the fiber optic splice holder to be increased, and in turn allows for a greater number of fiber optic splices to be accommodated by a single fiber optic splice holder.

Figure 1:
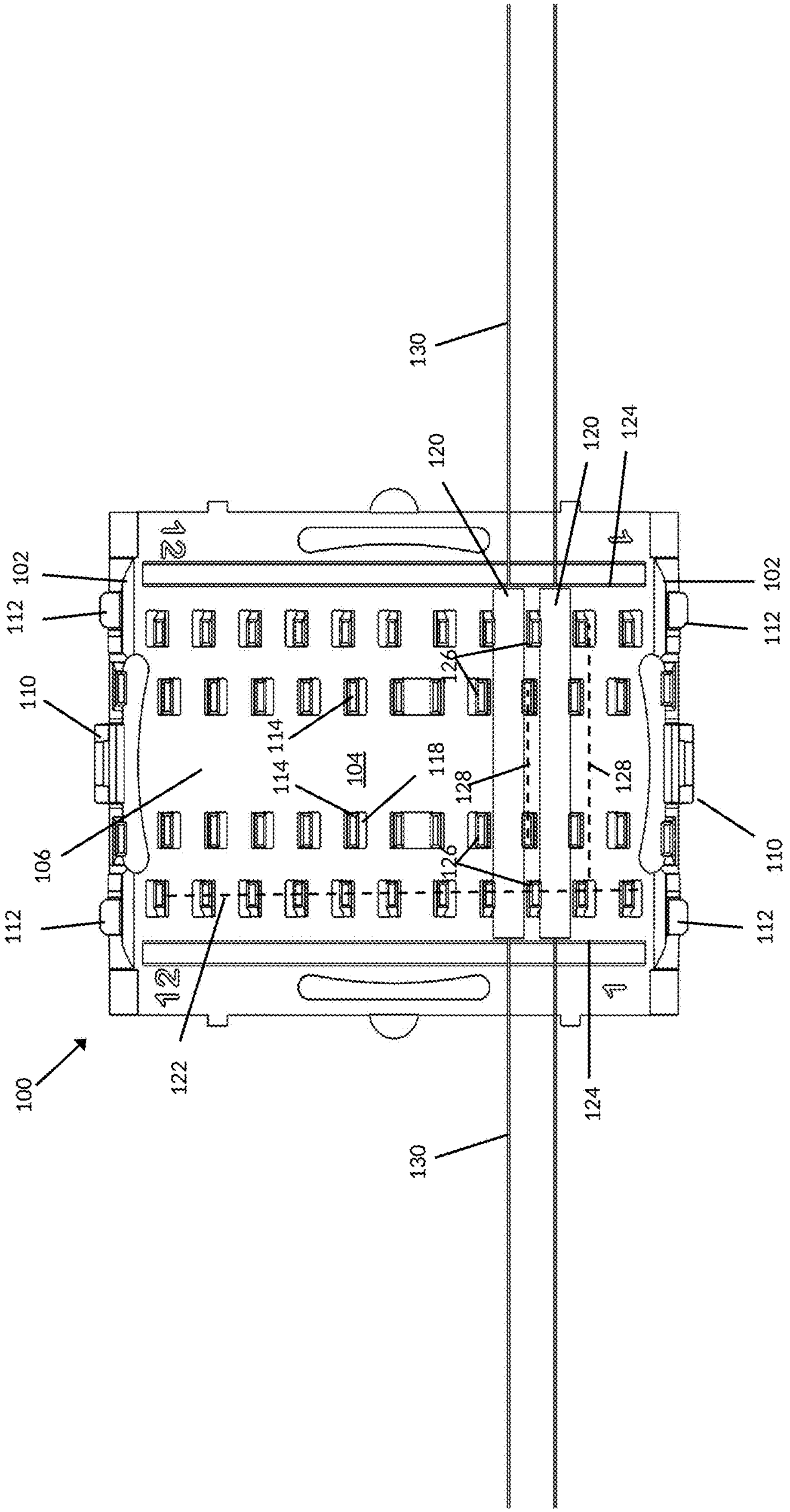
FIG. 1 depicts a plan-view perspective of a fiber optic splice holder with a pair of fiber optic splice sleeves being retained by fiber optic splice sleeve retention posts of the fiber optic splice holder, according to an embodiment.
Figure 2:
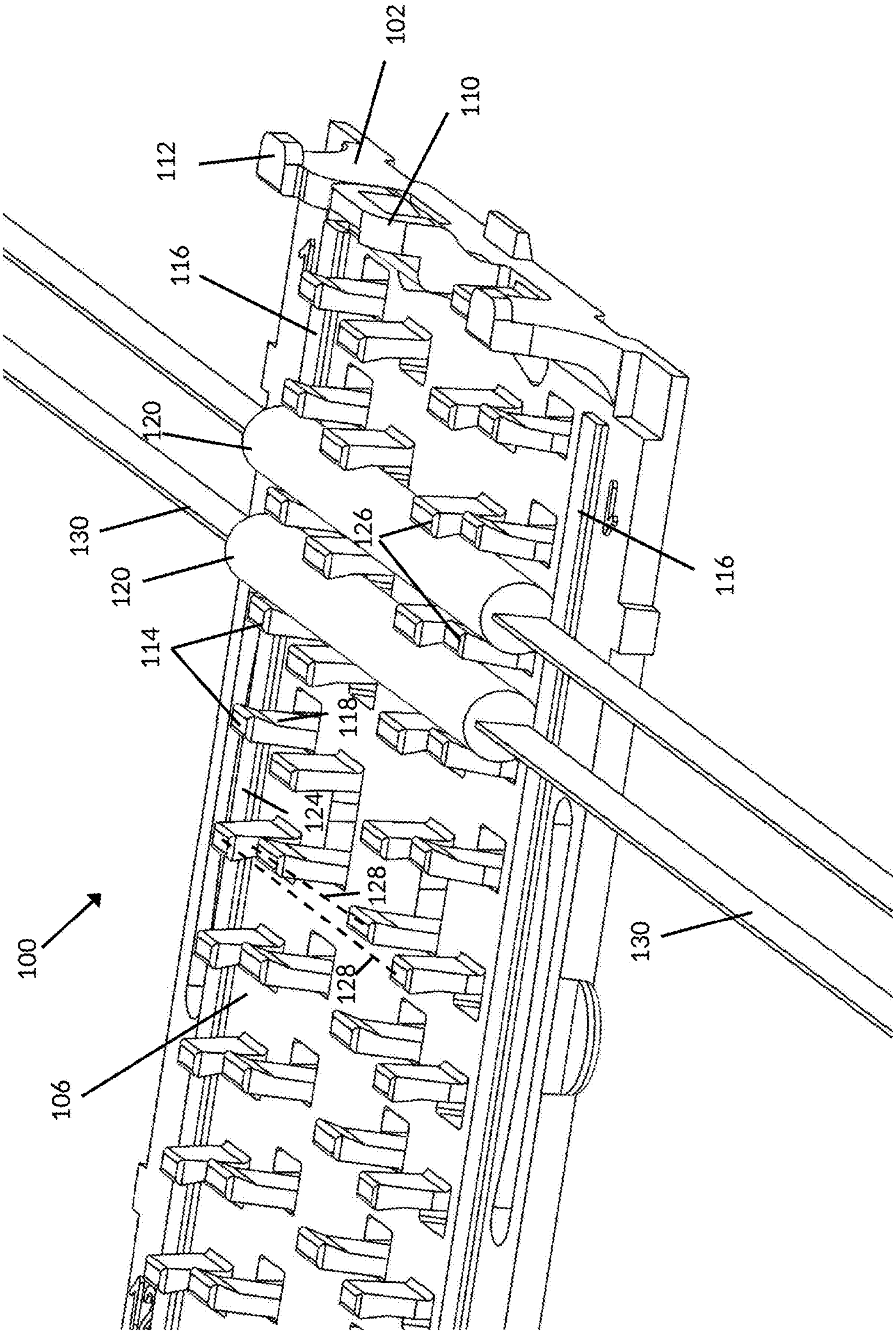
FIG. 2 depicts an isometric perspective of a fiber optic splice holder with a pair of fiber optic splice sleeves being retained by fiber optic splice sleeve retention posts of the fiber optic splice holder, according to an embodiment.

Referring to FIGS. 1 and 2, a fiber optic splice holder 100 comprises first and second sidewalls 102 that are laterally spaced apart from one another. The fiber optic splice holder 100 further comprises a floor section 104 extending between the first and second sidewalls 102. The floor section 104 comprises a planar upper surface 106 and a planar lower surface 108 (shown in FIG. 3) opposite the planar upper surface 106. The planar upper surface 106 and inward facing walls of the first and second sidewalls 102 collectively form a U-shaped conduit for the placement and retention of fiber optic splices within this region. Meanwhile, the planar lower surface 108 forms angled intersections with outward facing walls of the first and second sidewalls 102, thereby producing rectangular stackable geometry wherein the lower surface of the floor section 104 may contact upper edge sides of the first and second sidewalls 102 of an identical fiber optic splice holder 100, e.g., as seen in FIG. 4.

The fiber optic splice holder 100 may comprise first and second stacking retention features 110 that are disposed on the first and second sidewalls 102, respectively. The first and second stacking retention features 110 form a pair of opposing surfaces that are above the upper edge sides of the first and second sidewalls 102. The first and second stacking retention features 110 are used to securely affix a subjacent one of the fiber optic splice holder 100 to a superjacent one of the fiber optic splice holders 100 in a stacked arrangement, e.g., as shown in FIG. 4. In the stacked arrangement, the first and second stacking retention features 110 apply modest retention force to the sidewalls 102 of the superjacent fiber optic splice holder 100. Separately or in combination, the fiber optic splice holder 100 may comprise stacking interlock features 112. The stacking interlock features 112 engage with a correspondingly shaped depression in the bottom of a superjacent one of the fiber optic splice holders in a stacked arrangement, e.g., as shown in FIG. 4. This ensures proper alignment and positioning of these fiber optic splice holders 100 when forming a stacked arrangement. The stacking retention features 110 and the stacking interlock features 112 can be substantially similar or identical to the correspondingly named features described in U.S. Provisional Application 60/000,577 filed on Mar. 27, 2020, and International PCT Application PCT/US2021/024139 filed on Mar. 25, 2021, the content of each incorporated by reference herein in their entirety.

The fiber optic splice holder 100 comprises a plurality of fiber optic splice sleeve retention posts 114. The fiber optic splice sleeve retention posts 114 extend up from the upper surface 106 of the floor section 104. Thus, the surfaces of the fiber optic splice sleeve retention posts 114 are disposed above the upper surface 106 of the floor section 104. Upper ends of the fiber optic splice sleeve retention posts 114 can be disposed below the upper edge sides of the first and second sidewalls 102. In this way, there is clearance for multiple ones of the fiber optic splice holders 100 to be stacked on top of one another.

The fiber optic splice holder 100 further comprises first and second siderails 116 that are laterally spaced apart from one another. The first and second siderails 116 extend up from the upper surface 106 of the floor section 104. Thus, the surfaces of the first and second siderails 116 are disposed above the upper surface 106 of the floor section 104. The plurality of fiber optic splice sleeve retention posts 114 is arranged between the first and second siderails 116. That is, the fiber optic splice sleeve retention posts 114 are arranged to be on either side of the area that comprises the fiber optic splice sleeve retention posts 114. As shown, the first and second siderails 116 may be the closest structure to opposite facing outer edge sides of the floor section 104 and/or may run parallel to the opposite facing outer edge sides of the floor section 104.

The fiber optic splice sleeve retention posts 114 each comprise splice sleeve side contact surfaces 118 that face one of the first and second sidewalls 102. The splice sleeve side contact surfaces 118 are oriented transversely to the upper surface 106 of the floor section 104 so as to provide a backstop that prevents lateral movement of a fiber optic splice sleeve 120. Thus, pairs of the fiber optic splice sleeve retention posts 114 can be arranged on either side of a fiber optic splice sleeve 120, thereby restricting the fiber optic splice sleeve 120 to a predefined position by preventing lateral movement of the fiber optic splice sleeve 120 towards the first sidewall 102 or the second sidewall 102, as the case may be.

The plurality of fiber optic splice sleeve retention posts 114 may be arranged to comprise columns 122 of the fiber optic splice sleeve retention posts 114. Each of these columns 122 may extend in extend in a longitudinal direction between the first and second sidewalls 102. The columns 122 correspond to groups of the fiber optic splice sleeve retention posts 114 that are aligned with respect to an axis that runs in the longitudinal direction, which may be substantially perpendicular to the inward facing walls of the first and second sidewalls 102 and/or substantially parallel to the splice sleeve end contact surfaces 124 of the first and second siderails 116. The alignment along the axis that runs in the longitudinal direction may occur with respect to centroids of the fiber optic splice sleeve retention posts 114, outer edge sides of the fiber optic splice sleeve retention posts 114, or both. As shown, the fiber optic splice holder 100 comprises four of the columns 122. More generally, the fiber optic splice holder 100 can comprise different numbers of the columns 122, e.g., two, three, five, six, etc.

The splice sleeve side contact surfaces 118 of the fiber optic splice sleeve retention posts 114 from each of the columns 122 define fiber optic splice sleeve channels that extend in a lateral direction between the first and second siderails 116. That is, the splice sleeve side contact surfaces 118 of the fiber optic splice sleeve retention posts 114 form the outer boundaries of the fiber optic splice sleeve channels that prevent movement longitudinal direction. Each of the fiber optic splice sleeve channels is defined by a contacting pair 126 of the fiber optic splice sleeve retention posts 114 that are arranged on either side of the fiber optic splice sleeve channels. The contacting pair 126 refers to those fiber optic splice sleeve retention posts 114 with splice sleeve side contact surfaces 118 that face and define the fiber optic splice sleeve channel and are arranged on opposite sides of the fiber optic splice sleeve channel.

The plurality of fiber optic splice sleeve retention posts 114 may be arranged to comprise rows 128 of the fiber optic splice sleeve retention posts 114 that extend between the first and second siderails 116. Each of these rows 128 may extend in the lateral direction between the first and second siderails 116. The rows 128 correspond to groups of the fiber optic splice sleeve retention posts 114 that are aligned with respect to an axis that runs in the lateral direction, which may be substantially parallel to the inward facing walls of the first and second sidewalls 102 and/or substantially parallel to the splice sleeve end contact surfaces 124 of the first and second siderails 116. The alignment along the axis that runs in the lateral direction may occur with respect the splice sleeve side contact surfaces 118 of the fiber optic splice sleeve retention posts 114. As shown, the fiber optic splice holder 100 comprises twenty two of the rows 128. More generally, the fiber optic splice holder 100 can comprise different numbers of rows 128, e.g., sixteen, twenty, twenty four, twenty eight, etc.

The rows 128 of the fiber optic splice sleeve retention posts 114 may be staggered. That is, the fiber optic splice sleeve retention posts 114 from some of the columns 122 may be disposed within a first row 128, and other ones of the fiber optic splice sleeve retention posts 114 from different columns 122 may be disposed within a second row 128 that is offset from the first row 128 in the longitudinal direction. As a result of this staggering, the contacting pairs 126 of the fiber optic splice sleeve retention posts 114 are provided by fiber optic splice sleeve retention posts 114 from different columns 122. Stated another way, the staggered configuration of the rows 128 of the fiber optic splice sleeve retention posts 114 creates fiber optic splice sleeve channels that are defined by pairs of the fiber optic splice sleeve retention posts 114 that are offset from one another in the lateral direction.

In the depicted embodiment, the fiber optic splice sleeve retention posts 114 are arranged to comprise first, second, third and fourth ones of the columns 122, and the rows 128 of the fiber optic splice sleeve retention posts 114 are staggered such that the fiber optic splice sleeve retention posts 114 from the first and fourth columns 122 are in the same row 128 and such that such that fiber optic splice sleeve retention posts 114 from the second and third columns 122 are in the same row 128. As a result, for each of the fiber optic splice sleeve channels, a first contacting pair 126 of the fiber optic splice sleeve retention posts 114 is provided by the side contact surfaces from the first and second columns 122, and a second contacting pair 126 of the fiber optic splice sleeve retention posts 114 is provided by the splice sleeve side contact surfaces 118 from the third and fourth columns 122. More generally, the staggering concept can be used to create a variety of different arrangements of contacting pairs 126 of the fiber optic splice sleeve retention posts 114, wherein closely arranged fiber optic splice sleeve channels are created by the offset in the longitudinal direction.

The first and second siderails 116 each extend up from the upper surface 106 of the floor section 104. That is, the fiber optic splice sleeve retention posts 114 form protrusions in the floor section 104 of the fiber optic splice holder 100 in an area between the first and second sidewalls 102. The first and second siderails 116 can be configured as elongated spans, i.e., structures with a greater length than width, that extend in the longitudinal direction between the first and second sidewalls 102. Upper ends of the first and second siderails 116 are disposed below upper ends of each of the fiber optic splice sleeve retention posts 114. Meanwhile, the upper ends of each of the fiber optic splice sleeve retention posts 114 are disposed below the upper ends of the first and second sidewalls 102.

The first and second siderails 116 form a rim-like structure that acts as a backstop to restrict the movement of a fiber optic splice sleeve 120 beyond the first and second siderails 116 in the lateral direction. To this end, the first and second siderails 116 each comprise splice sleeve end contact surfaces 124 that face the plurality of fiber optic splice sleeve retention posts 114 and run substantially perpendicular to the splice sleeve side contact surfaces 118. In an embodiment, the splice sleeve end contact surfaces 124 extend between the planar upper surface 106 of the floor section 104 and the respective upper ends of the first and second siderails 116. The splice sleeve end contact surfaces 124 may be substantially perpendicular to the planar upper surface 106 of the floor section 104. Separately or in combination, the splice sleeve end contact surfaces 124 of the first and second siderails 116 may form an angled intersection with the floor section 104.

According to an embodiment, a vertical displacement of the first and second siderails 116 as between the planar upper surface 106 of the floor section 104 and the respective upper ends of the first and second siderails 116 is no greater than 25 percent of a vertical displacement of the fiber optic splice sleeve retention posts 114 as between the planar upper surface 106 of the floor section 104 and the upper ends of the fiber optic splice sleeve retention posts 114. In a more particular embodiment, the vertical displacement of the first and second siderails 116 can be between about 5 percent and 15 percent of the vertical displacement of the fiber optic splice sleeve retention posts 114. Values generally in this range allow for the fiber optic splice sleeves 120 to be sufficiently prevented from moving in the lateral direction while simultaneously providing sufficient clearance for exposed ribbon portions extending over the first and second siderails 116.

In the depicted embodiment, a first fiber optic splice sleeve 120 is disposed within and securely retained by a first one of the fiber optic splice sleeve channels from the fiber optic slice holder 100, and a second fiber optic splice sleeve 120 is disposed within and securely retained by a second one of the fiber optic splice sleeve channels from the first fiber optic slice holder 100. The first and second first fiber optic splice sleeves 120 each form a splice between two ribbon fibers 130. As shown, the portions of these two spliced ribbon fibers 130 may extend away from one another in opposite directions and over the first and second siderails 116. The ribbon fibers 130 may be from so-called rollable ribbon fiber optic cable. Rollable ribbon fiber optic cable is a particular kind of high-density cable that includes multiple optical fibers. A single rollable ribbon fiber optic cable can have optical fiber counts of 864, 1152, 1728, 3456, 6912, for example. In rollable ribbon fiber optic cable, the optical fibers rest in a tightly wrapped spiral arrangement. By applying compressive force to the cable, these fibers project out from the spiral, allowing for easy access to each fiber. More generally, the fiber optic splice sleeve 120 can form a fiber optic splice between any variety of different fiber optic cable types. Exemplary cable types include single mode cable, multi-mode cable, indoor-outdoor cable, loose buffer tube cable, and conventional or flat ribbon fiber cable. The fiber optic splice sleeves 120 can be a commercially available and/or standardized component that surrounds and protects the spliced optical fiber. Generally speaking, a diameter of the fiber optic splice sleeves 120 can be in the range of 2-50 mm (millimeters), and may be between about 20 mm and 25 mm in certain embodiments. Generally speaking, a length of the fiber optic splice sleeves 120 can be in the range of 25 mm and 500 mm.

The first fiber optic splice sleeve 120 is securely retained within a first one of the fiber optic splice sleeve channels in the following way. Side surfaces of the first fiber optic splice sleeve 120 are retained by the splice sleeve side contact surfaces 118 from first and second contacting pairs 126 of the fiber optic splice sleeve retention posts 114 that define the first fiber optic splice sleeve channel. The side surfaces of the first fiber optic splice sleeve 120 may directly contact the splice sleeve side contact surfaces 118 from first and second contacting pairs 126. Alternatively, the side surfaces of the first fiber optic splice sleeve 120 may be spaced apart from the splice sleeve side contact surfaces 118 from first and second contacting pairs 126, i.e., the diameter of the first fiber optic splice sleeve 120 is less than the diameter of the first channel. In either case, the first and second contacting pairs 126 of the fiber optic splice sleeve retention posts 114 prevent the first fiber optic splice sleeve 120 from sliding towards the first or second sidewalls 102 in the longitudinal direction. Meanwhile, the first fiber optic splice sleeve 120 comprises opposite facing ends that are retained by the splice sleeve end contact surfaces 124 of the first and second siderails 116. The opposite facing ends of the first fiber optic splice sleeve 120 may directly contact the splice sleeve end contact surfaces 124 of the first and second siderails 116. Alternatively, the opposite facing ends of the first fiber optic splice sleeve 120 may be spaced apart from the splice sleeve end contact surfaces 124 of the first and second siderails 116, i.e., the length of the first fiber optic splice sleeve 120 is less than the lateral spacing between the first and second siderails 116. In either case, the first and second siderails 116 prevent the first fiber optic splice sleeve 120 from sliding in the lateral direction. The second fiber optic splice sleeve 120 is securely retained within a second one of the fiber optic splice sleeve channels in the same way that the first fiber optic splice sleeve 120 is securely retained within the first one of the fiber optic splice sleeve channels.

Figure 3:
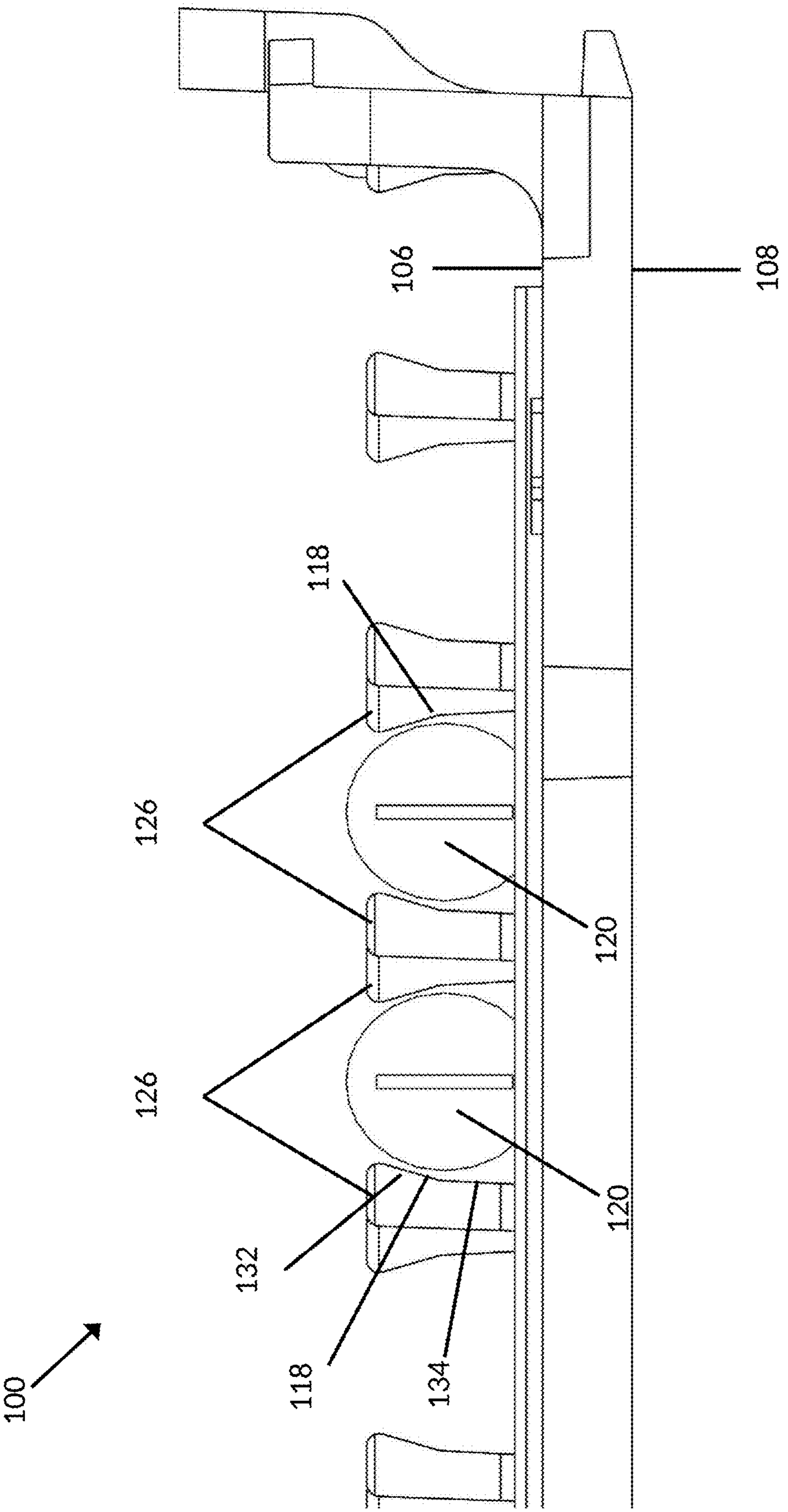
FIG. 3 depicts a side-view perspective of a fiber optic splice holder with a pair of fiber optic splice sleeves being retained by fiber optic splice sleeve retention posts of the fiber optic splice holder, according to an embodiment.
Figure 4:
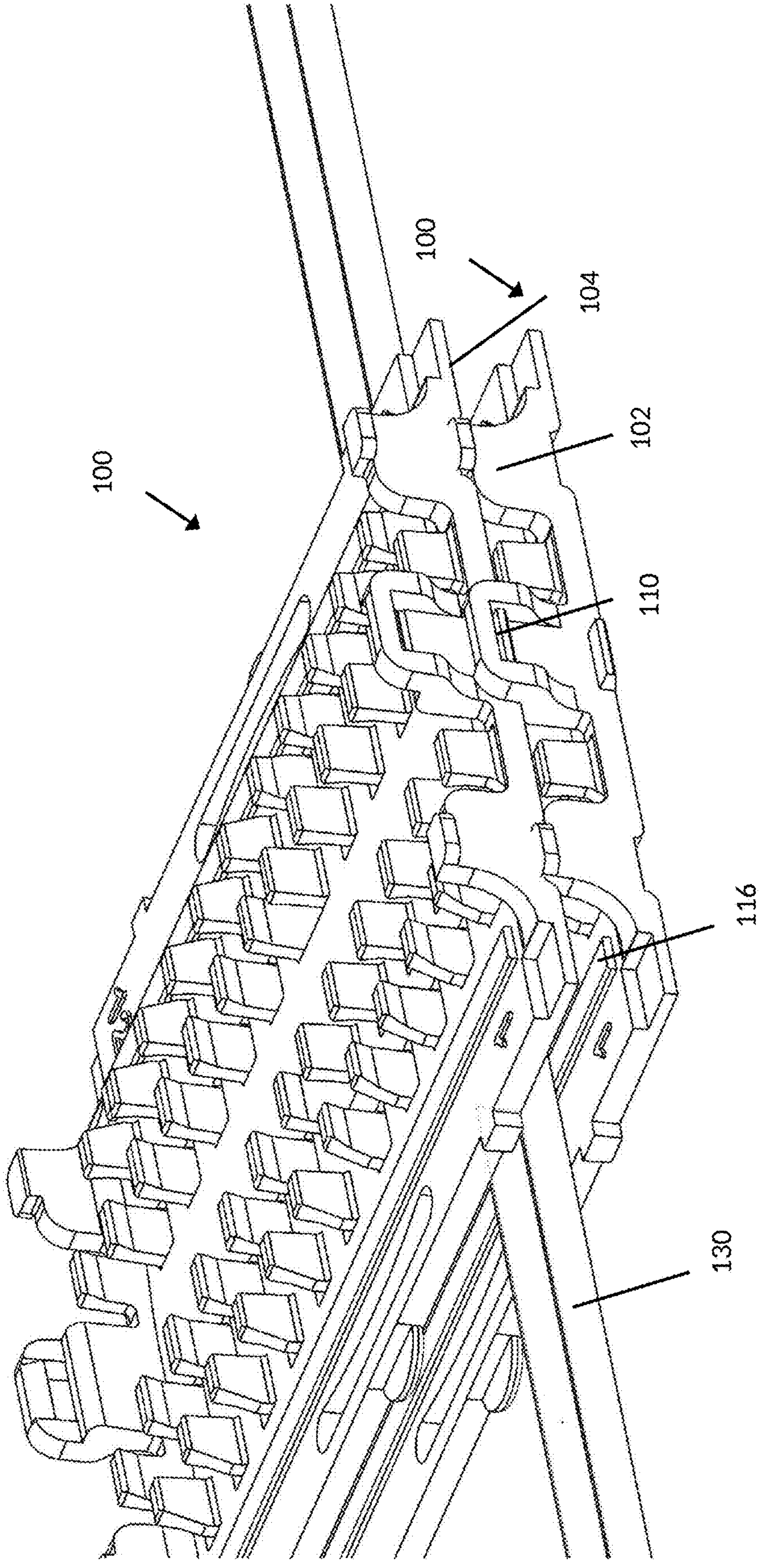
FIG. 4 depicts an isometric view of two fiber optic splice holders in a stacked arrangement with a lower one of the fiber optic splice holders retaining a pair of fiber optic splice sleeves, according to an embodiment.

Referring to FIG. 3, a side profile of a first contacting pair 126 of the fiber optic splice sleeve retention posts 114 that defines the fiber optic splice sleeve channel and a second contacting pair 126 of the fiber optic splice sleeve retention posts 114 that defines the second fiber optic splice sleeve channel is shown. As shown, the splice sleeve side contact surfaces 118 of each contacting pair 126 converge inward so as to reduce a diameter of the respective fiber optic splice sleeve channels in an upper region of the fiber optic splice sleeve channel that is spaced apart from the floor section 104. Stated another way, the splice sleeve side contact surfaces 118 are arranged to tilt relative to the upper surface 106 of the floor section 104 as they approach the upper ends of each of the fiber optic splice sleeve retention posts 114. In this way, the fiber optic splice sleeves 120 are prevented from moving away from the floor section 104 once they are securely retained within the fiber optic splice sleeve channels.

In the depicted embodiment, the splice sleeve side contact surfaces 118 of each of the contacting pairs 126 comprise upper spans 132 and lower spans 134, with the upper spans 132 being further away from the floor section 104 than the lower spans 134. The upper spans 132 of each of the contacting pairs 126 converge inward to a higher degree than the lower spans 134. That is, the angle of orientation of the upper spans 132 of the splice sleeve side contact surfaces 118 relative to the upper surface 106 of the floor section 104 is greater than the angle of orientation of the lower spans 134. More generally, the inward converging concept can be obtained by any geometry that reduces the the diameter of the fiber optic splice sleeve channels moving towards upper ends of each of the fiber optic splice sleeve retention posts 114. For example, the splice sleeve side contact surfaces 118 of each contacting pair 126 may comprise curved surfaces and/or a convex shape.

In the depicted embodiment, the splice sleeve side contact surfaces 118 of a first fiber optic splice sleeve retention post 114 converges towards a first one of the fiber optic splice sleeve channels and the splice sleeve side contact surfaces 118 of a second fiber optic splice sleeve retention post 114 converges towards a second one of the fiber optic splice sleeve channels, wherein the first and second first fiber optic splice sleeve retention posts 114 are each disposed between the first and second fiber optic splice sleeve channels. That is, the first fiber optic splice sleeve retention post 114 comprises a splice sleeve side contact surface 118 that is tilted towards the first fiber optic splice sleeve channel and the second fiber optic splice sleeve retention post 114, which is in a different column as the first fiber optic splice sleeve retention post 114 but is disposed between the same first and second fiber optic splice sleeve channels, comprises a splice sleeve side contact surface 118 that is tilted towards the second fiber optic splice sleeve channel. As a result, the splice sleeve side contact surfaces 118 of the first fiber optic splice sleeve retention post 114 converges towards the first fiber optic splice sleeve channel and the splice sleeve side contact surfaces 118 of the second fiber optic splice sleeve retention post 114 converges towards the second fiber optic splice sleeve channel.

Due to the staggering of the rows 128 as described above, the fiber optic splice sleeve retention posts 114 from the first contacting pair 126 are staggered relative to the fiber optic splice sleeve retention posts 114 from the second contacting pair 126, such that a first one of the fiber optic splice sleeve retention posts 114 from the first contacting pair 126 that is disposed between the first and second channels does not contact the second fiber optic splice holder 100, and a first one of the fiber optic splice sleeve retention posts 114 from the second contacting pair 126 that is disposed between the first and second channels does not contact the first fiber optic splice holder 100. Instead, the first one of the fiber optic splice sleeve retention posts 114 from the second contacting pair 126 comprises a planar back surface that faces and is spaced apart from the first fiber optic slice holder, and the first one of the fiber optic splice sleeve retention posts 114 from the first contacting pair 126 comprises a planar back surface (not shown) that faces and is spaced apart from the second fiber optic slice holder. This configuration results in advantageous space efficiency by providing a separation distance between two immediately adjacent ones of the fiber optic splice sleeves 120 that is only slightly greater than the width of one of the fiber optic splice sleeve retention posts 114. As can be seen from FIG. 3, the staggering may be such that the fiber optic splice sleeve retention posts 114 from different rows 128 overlap with one another from a side-perspective, with only a small gap between the planar back surfaces of the splice sleeve retention posts and the immediately adjacent but non-contacted fiber optic splice sleeve 120. This increased space efficiency allows for a greater number of first fiber optic splices to be retained by a single one of the fiber optic splice holders 100. For example, the fiber optic splice holders 100 may comprise at least 8, 10, 12, 14, 16 or more separate fiber optic splice sleeve channels, which in turn can accommodate splices between 96, 122, 144, 168, 192 fibers or more. Meanwhile, the staggering concept allows for the fiber optic splice sleeve retention posts 114 to be narrower in comparison to a configuration wherein fiber optic splice sleeve retention posts 114 are double sided, with front and back sides defining two immediately adjacent fiber optic splice sleeve channels. The narrower fiber optic splice sleeve retention posts 114 provide greater elasticity allow for easy manipulation and movement for placement and removal of the fiber optic splice sleeves 120, while providing a semi-rigid structure that securely retains the fiber optic splice sleeves 120 thereafter. Moreover, the staggering concept concept minimizes the pressure points on any particular fiber optic splice sleeve 120 while simultaneously providing retention points at high leverage locations.

Referring to FIG. 4, an assembly comprising first and second fiber optic splice holders 100 stacked on top of one another is depicted, according to an embodiment. The second fiber optic splice holder 100 is arranged such that the floor section 104 of the second fiber optic splice rests on the upper edge sides of the first and second sidewalls 102 from the first fiber optic splice holder 100. The stacking retention features 110 of the first fiber optic splice holder 100 interface with the first and second sidewalls 102 of the second fiber optic splice holder 100 such that the second fiber optic splice holder 100 is securely retained against the first fiber optic splice holder 100.

In the assembly, the first and second siderails 116 from the first fiber optic slice holder 100 are spaced apart from the floor section 104 of the second fiber optic slice holder. The fiber optic splice sleeve channels of the first fiber optic splice holder 100 are accessible are accessible via gaps between the first and second siderails 116 from the first fiber optic slice holder 100 and the floor section 104 of the second fiber optic slice holder 100. Moreover, these gaps provide clearance between the first and second fiber optic splice holders 100 such that the two ribbon fibers 130 which form the splices can extend over the first and second siderails 116 from the from the first fiber optic slice holder while being below the floor section 104 from the second fiber optic splice holder 100.

The stacking concept illustrated in FIG. 4 can be repeated multiple times to form an assembly with multiples ones of the fiber optic splice holders 100, e.g., three four, five, six, etc., stacked on top of one another. While FIG. 4 depicts only two fiber optic splices being retained by the lower fiber optic splice holder 100, the system allows for each of the fiber optic splice holders 100 to accommodate up to a maximum dictated by the number of fiber optic splice holder 100 channels. These assemblies can be arranged in fiber optic splice storage compartments that also accommodate slack cable from the ribbon fibers 130 of each splice. A bottom one of the fiber optic splice holder 100 can be arranged and securely retained within a correspondingly dimensioned receptacle in one of these fiber optic splice storage compartments.

The term "substantially" encompasses absolute conformity with a requirement as well as minor deviation from absolute conformity with the requirement due to manufacturing process variations, assembly, and other factors that may cause nominal differences. For example, typical processing techniques form parts within a statistical range of acceptable conformance. If the element in question is within this range of acceptable conformance, it is substantially compliant with the property in question.

Spatially relative terms such as "under," "below," "lower," "over," "upper," "top," bottom" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A fiber optic splice holder comprising:

first and second sidewalls that are laterally spaced apart from one another;

a floor section extending between the first and second sidewalls;

a plurality of fiber optic splice sleeve retention posts that extend up from a planar upper surface of the floor section; and first and second siderails that extend up from the planar upper surface of the floor section and are laterally spaced apart from one another, wherein the plurality of fiber optic splice sleeve retention posts are arranged between the first and second siderails, wherein upper ends of the first and second siderails are disposed below upper ends of the plurality of fiber optic splice sleeve retention posts and the first and second siderails include splice sleeve end contact surfaces that face one another for retaining opposite facing ends of fiber optic splice sleeves, and wherein the plurality of fiber optic splice sleeve retention posts include splice sleeve side contact surfaces that face one of the first and second sidewalls.

2. The fiber optic splice holder of claim 1, wherein the plurality of fiber optic splice sleeve retention posts are arranged to form columns of the fiber optic splice sleeve retention posts that extend in a longitudinal direction between the first and second sidewalls, and wherein the splice sleeve side contact surfaces of the fiber optic splice sleeve retention posts from at least one of the columns and defines fiber optic splice sleeve channels that extend in a lateral direction between the first and second siderails.

3. The fiber optic splice holder of claim 2, wherein the fiber optic splice sleeve channels are defined by contacting pairs of the fiber optic splice sleeve retention posts that are arranged on either side of the fiber optic splice sleeve channels, and wherein the splice sleeve side contact surfaces of the contacting pairs converge inward so as to reduce a diameter of the respective fiber optic splice sleeve channels in an upper region of the fiber optic splice sleeve channels that are spaced apart from the floor section.

4. The fiber optic splice holder of claim 3, wherein the splice sleeve side contact surfaces of the contacting pairs include upper spans and lower spans, the upper spans being further away from the floor section than the lower spans, and wherein the upper spans of the contacting pairs converge inward to a higher degree than the lower spans.

5. The fiber optic splice holder of claim 3, wherein the plurality of fiber optic splice sleeve retention posts are arranged to form rows of the fiber optic splice sleeve retention posts that extend in the lateral direction between the first and second siderails, and wherein the fiber optic splice sleeve channels are defined by the splice sleeve side contact surfaces of the fiber optic splice sleeve retention posts from two of the rows of the fiber optic splice sleeve retention posts arranged on either side of the fiber optic splice sleeve channels that are closest to one another.

6. The fiber optic splice holder of claim 5, wherein the rows of the fiber optic splice sleeve retention posts are staggered such that the contacting pairs of the fiber optic splice sleeve retention posts are provided by fiber optic splice sleeve retention post from different columns.

7. The fiber optic splice holder of claim 6, wherein the plurality of fiber optic splice sleeve retention posts are arranged to include first, second, third and fourth ones of the columns of the fiber optic splice sleeve retention posts, and wherein the rows of the fiber optic splice sleeve retention posts are staggered such that fiber optic splice sleeve retention posts from the first and fourth columns are in a same row, such that the fiber optic splice sleeve retention posts from the second and third columns are in the same row.

8. The fiber optic splice holder of claim 6, wherein the splice sleeve side contact surfaces of a first fiber optic splice sleeve retention post converges towards a first one of the fiber optic splice sleeve channels and the splice sleeve side contact surfaces of a second fiber optic splice sleeve retention post converges towards a second one of the fiber optic splice sleeve channels, and wherein the first and second fiber optic splice sleeve retention posts are disposed between the first and second fiber optic splice sleeve channels.

9. The fiber optic splice holder of claim 2, wherein the first and second siderails include elongated spans that extend parallel to the columns.

10. The fiber optic splice holder of claim 9, wherein the splice sleeve end contact surfaces extend between the planar upper surface of the floor section and the respective upper ends of the first and second siderails, and wherein the splice sleeve end contact surfaces of the first and second siderails are substantially perpendicular to the planar upper surface of the floor section.

11. The fiber optic splice holder of claim 10, wherein a vertical displacement of the first and second siderails between the planar upper surface of the floor section and the respective upper ends of the first and second siderails is no greater than 25 percent of a vertical displacement of the fiber optic splice sleeve retention post between the planar upper surface of the floor section and the upper ends of the fiber optic splice sleeve retention post.

12. The fiber optic splice holder of claim 1, further comprising:

first and second stacking retention features that are disposed on the first and second sidewalls, respectively, wherein the first and second stacking retention features form a pair of opposing surfaces that are above upper edge sides of the first and second sidewalls.

13. An assembly, comprising:

first and second fiber optic splice holders stacked on top of one another, the first and second fiber optic splice holders comprising:

a floor section extending between first and second sidewalls;

a plurality of fiber optic splice sleeve retention posts that extend up from a planar upper surface of the floor section; and first and second siderails that extend up from the planar upper surface of the floor section and are laterally spaced apart from one another, stackability features formed in the first and second sidewalls, wherein the plurality of fiber optic splice sleeve retention posts are arranged between the first and second siderails, wherein the fiber optic splice sleeve retention posts include splice sleeve side contact surfaces that face one of the first and second sidewalls, and wherein the first and second siderails include splice sleeve end contact surfaces that face the plurality of fiber optic splice sleeve retention posts and run substantially perpendicular to the splice sleeve side contact surfaces for retaining opposite facing ends of fiber optic splice sleeves, wherein the stackability features of the first fiber optic splice holder with the first and second sidewalls of the second fiber optic splice holder such that the second fiber optic splice holder is securely retained against the first fiber optic splice holder.

14. The assembly of claim 13, wherein for one or more of the first and second fiber optic splice holders:

the plurality of fiber optic splice sleeve retention posts are arranged to form columns of the fiber optic splice sleeve retention posts that extend in a longitudinal direction between the first and second sidewalls;

the splice sleeve side contact surfaces of the fiber optic splice sleeve retention posts from at least one of the columns defines fiber optic splice sleeve channels that extend in a lateral direction between the first and second siderails; and the fiber optic splice sleeve channels are accessible via gaps between the first and second siderails from the first fiber optic splice holder and the floor section of the second fiber optic splice holder.

15. The assembly of claim 14, further comprising;

a first fiber optic splice sleeve that is disposed within and securely retained by a first one of the fiber optic splice sleeve channels from the first fiber optic splice holder, wherein side surfaces of the first fiber optic splice sleeve are retained by the splice sleeve side contact surfaces from a first contacting pair of the fiber optic splice sleeve retention posts, and wherein opposite facing ends of the first fiber optic splice sleeve are retained by the splice sleeve end contact surfaces of the first and second siderails from the first fiber optic splice holder.

16. The assembly of claim 15, wherein the first fiber optic splice sleeve forms a splice between two ribbon fibers, and wherein the two ribbon fibers extend over the first and second siderails from the first fiber optic splice holder and below the floor section from the second fiber optic splice holder.

17. The assembly of claim 16, wherein the splice sleeve side contact surfaces of the first contacting pair converges inward so as to retain an upper side of the first fiber optic splice holder.

18. The assembly of claim 17, further comprising:

a second fiber optic splice sleeve that is disposed within and securely retained by a second one of the fiber optic splice sleeve channels from the first fiber optic splice holder, wherein side surfaces of the second fiber optic splice sleeve are retained by the splice sleeve side contact surfaces from a second contacting pair of the fiber optic splice sleeve retention post, and wherein opposite facing ends of the second fiber optic splice sleeve are retained by the splice sleeve end contact surfaces of the first and second siderails from the first fiber optic splice holder.

19. The assembly of claim 18, wherein the first and second fiber optic splice sleeves are immediately adjacent to one another, and wherein the first contacting pair is staggered with respect to the second contacting pair such that the first contacting pair does not contact the second fiber optic splice sleeve and such that the second contacting pair does not contact the first fiber optic splice holder.

20. The assembly of claim 19, wherein a first one of the fiber optic splice sleeve retention posts from the second contacting pair includes a planar back surface that faces and is spaced apart from the first fiber optic splice holder.

* * * * *